Jan. 4, 1949.  J. A. CASS  2,458,345
APPARATUS FOR THRASHING PODDED
OR SHELL INCLOSED FIELD CROPS
Filed Dec. 3, 1945
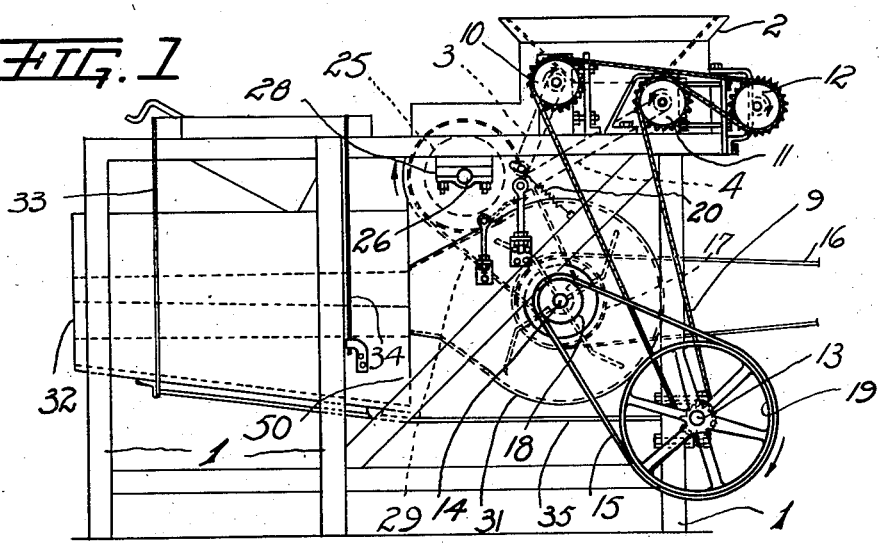
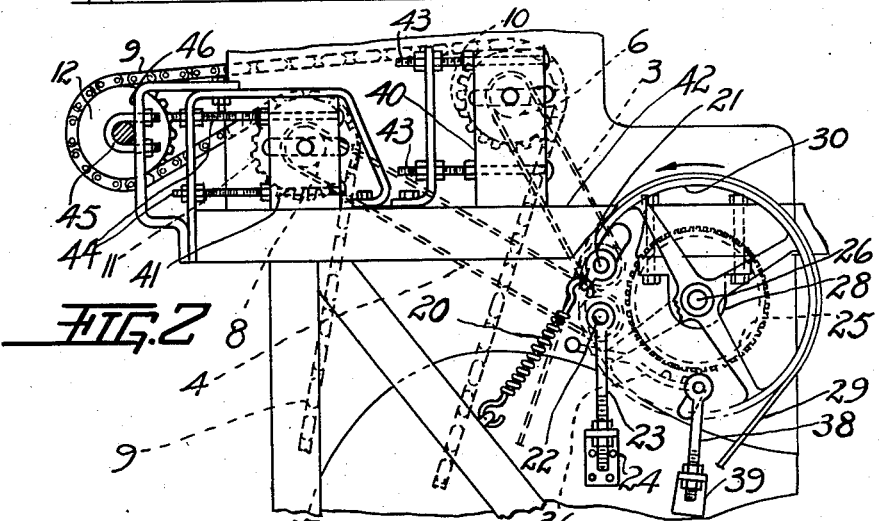
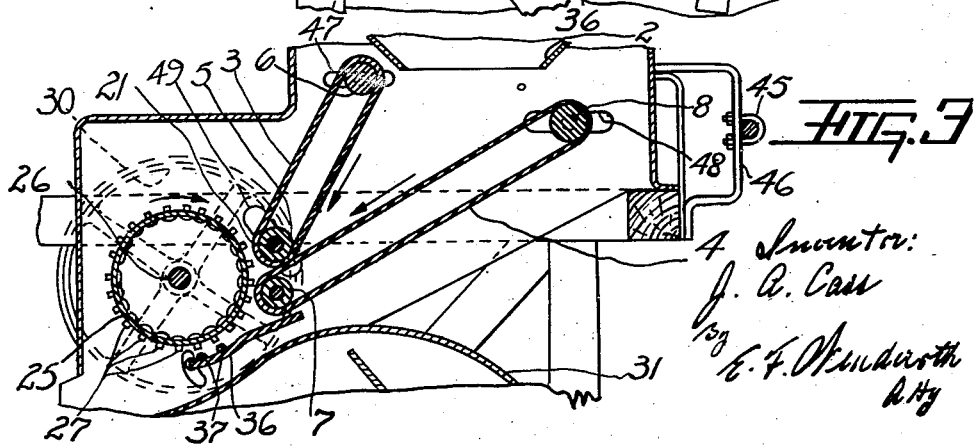

UNITED STATES PATENT OFFICE 2,458,345

APPARATUS FOR THRASHING PODDED OR SHELL INCLOSED FIELD CROPS

John Andries Cass, Mooifontein, Transvaal, Union of South Africa

Application December 3, 1945, Serial No. 632,450
In the Union of South Africa July 16, 1945

8 Claims. (Cl. 130—30)

This invention relates to an improved method of and apparatus for thrashing field crops and refers more particularly to a method and machine adapted for the purpose of thrashing beans, peas and like crops, although it is not intended to limit its application to this specific use. An object of the invention is to provide a thrashing machine for the purpose set forth which will reduce to a minimum the percentage of seeds or kernels which are broken or damaged in the course of the thrashing operation. It is well known that if ordinary thrashing machines are used for the thrashing of beans and peas, a large percentage of the seeds or kernels are broken or cracked.

The method according to the invention consists in feeding the crop to be thrashed between the opposing surfaces of two converging feeding belt conveyors or the equivalent which pass over terminal rollers disposed close to one another and adjacent to and parallel with a rubbing drum, which is arranged to rotate with its periphery close to what constitutes the feed opening between said rollers through which opening the crop is slowly fed by the belts of said feeding conveyors, the arrangement being such that as the pods or shells are projected towards the periphery of the rubbing drum, they are, while being resiliently held in said feed opening, broken open and split by what is in effect a rubbing or scraping action, which thereby releases the kernels which drop downwardly, preferably on to sieving and winnowing means provided at a lower level.

More particularly both the feeding belt conveyors and the rubbing drum are arranged to rotate at relatively slow speeds. Both felt conveyors pass over terminal rollers which are arranged one above the other in close association with the aforesaid rubbing drum. One or other of said terminal rollers is resiliently mounted whereby the pods or shells as they pass between the rollers are subjected to a resilient gripping action which obviates any tendency to break or crack the kernels by crushing, and also allows for automatic adjustment of the feed opening due to variation in the rate of feed. To facilitate the breaking or splitting of the pods or shells to free the kernels therefrom, the rubbing drum is provided with a plurality of projections on its peripheral surface. The said projections are preferably in the form of short studs of metal or other material. It is to be understood that the pods or shells are actually split and broken up by what is in effect a rubbing or scraping action, in contradistinction to the usual beating action which is employed in thrashing machines as presently used.

According to a preferred construction of apparatus for carrying out the invention, the aforesaid converging feeding conveyor belts form two sides of the bottom of a feed hopper, and are arranged to project downwardly and to one side of said hopper where they pass over the two aforesaid terminal rollers which are arranged one above the other. The said rubbing drum is arranged to rotate so that the side thereof which faces the aforesaid terminal rollers rotates in a downward direction, whereby the broken pods and freed kernels or seeds are encouraged to drop downwardly, either directly on to a sieve or, in a preferred construction of machine, on to a short concave provided with rubber ribs where further separation of the kernels from the stalks, pods and trash takes place before the mixed kernels and trash are fed to sieving means, which sieving means is preferably associated with a blower whereby the light particles of the pods and stalks as well as the dust, are blown outwardly of the machine by a winnowing action.

Preferably the upper of the two aforesaid terminal rollers is spring supported. The lower roller is also adjustably mounted whereby the distance from the feed opening between the rollers and the rubbing drum is capable of adjustment within limits to suit different thrashing conditions.

The aforesaid feeding conveyor belts are preferably driven at equal speeds by suitable driving means transmitting power to the driving shafts thereof, which shafts are located one on each side of the aforesaid feed hopper.

To enable the invention to be more clearly understood and carried into practice, reference is now made to the accompanying sheet of drawings, in which like reference numerals refer to like parts throughout the several views.

In the drawings:

Fig. 1 is a side elevation of a thrashing machine constructed according to the invention;

Fig. 2 is an enlarged fragmentary side elevation of the top portion of the machine of Fig. 1, but taken from the opposite side thereof; and Fig. 3 is a fragmentary central vertical sectional view of the top portion of the machine of Fig. 1, shown to a larger scale.

Referring to the drawings, reference 1 denotes a timber framework supporting the various parts of the machine. The crop to be thrashed is fed into the machine by way of the feed hopper 2, whence it drops between the two endless converging feeding conveyor belts 3 and 4, which are driven so that the two opposing inner runs thereof, travel at the same speed and in the converging downward directions as indicated by the arrows in Fig. 3. The top conveyor belt 3 passes round a terminal roller 5 and a driving roller 6, while the lower conveyor belt 4 passes round a terminal 7 and a driving roller 8.

The driving rollers 6 and 8 are driven by means of an endless chain 9 passing round chain wheels 10 and 11, tensioning chain wheel 12 and a driving sprocket on the countershaft 13, which is driven from the main shaft 14 by the belt 15, passing over pulleys 18 and 19, said main shaft 14 being driven from any convenient source of power by the belt 16 passing over the driving pulley 17.

The terminal roller 5 is pressed resiliently towards the terminal roller 7 by tension springs 20 connected to the ends of the shaft 21 on which the roller 5 is mounted, as clearly shown in Fig. 2. The position of the terminal roller 7 is made adjustable within limits by arranging for the bearings at each end of its shaft 22, to be supported by the screw-threaded adjusting eye-bolts 23, which co-act with brackets 24 fixed to the casing walls which enclose the several parts of the machine.

As clearly shown in Fig. 2, the rubbing drum 25 mounted on its shaft 26, is so arranged that on rotation its downwardly moving side is in close proximity to the feed opening between the terminal rollers 5 and 7, so that the pods, shells or the like, which are fed through said feed opening, come in contact with the periphery of the rubbing drum, while still being resiliently held between said rollers, which periphery is provided with a plurality of short studs 27 to facilitate the action of splitting the pods, shells or the like. The rubbing drum shaft 26, which is journalled in bearing 28, is driven from a pulley on the main shaft 14 by a belt 29 passing over a pulley 30 keyed thereto.

The main shaft 14 passes through the casing of a winnowing blower 31 and has the bladed rotor thereof keyed to it. The blower 31 is arranged to project an air blast through the sieving unit 32, suspended by springs 33 and 34 and adapted to be reciprocated by a pitman 35 connected to an eccentric on the counter shaft 13.

Located in spaced relationship with the underside of the rubbing drum 25, is a short concave 36, extending the full length of said drum, and provided on its top side with one, two or more rubber strips 37 which co-act with the studs 27 to effect further separation of the kernels from the stalks, pods and trash which drop onto the said concave.

For purposes of adjustment the rear end of the concave 36 is pivotally mounted in the side casing walls while the front end is supported by the eye bolts 38 co-acting with the brackets 39 fixed to said side walls of the casing.

The shafts of the driving rollers 6 and 8 are journalled in bearing blocks 40 and 41 respectively, which are slidably supported on the top frame member 42 and are adjustably positionable for belt tensioning purposes, by means of the bolts 43 and 44 respectively, which co-act with bracket members as clearly shown in Fig. 2. The shaft carrying the tensioning chain wheel 12 is adjustably positionable by means of the U-bolts 45, which co-act with a series of holes in the brackets 46. To allow of movement of the several shafts for adjustment purposes, slotted openings as shown at 47, 48 and 49 in Fig. 3, are cut in the side wall casing.

In operation the bean, pea or like crop to be thrashed is fed into the hopper 2, which feeds it between the converging feed conveyor belts 3 and 4 which in turn feed the crop towards the periphery of the rotating rubbing drum 25. It is to be understood that the pods or shells are split and caused to disintegrate by the rubbing or scraping action of the studs 27 against the protruding end portions of said pods or shells, it being understood that the opposite end portions are held by a resilient nipping action between the terminal rollers 5 and 7, as they are projected towards the rubbing drum. The partly disintegrated material then drops on to the concave 36, where final splitting and disintegration of the pods or shells takes place. Thereafter the mixed kernels and trash slide down the sloping top of the casing of the blower 31 into the sieving unit 32, in which separation of the kernels from the stalks and trash takes place by winnowing and sieving action according to known practice. The clean seeds or kernels are discharged from the lower end 50 of the sieving unit 32 into any convenient collecting means, while the trash and dust is expelled from the open front end thereof.

A suitable peripheral speed for the rubbing drum 25 is about 340 feet per minute and for the feeding conveyor belts 3 and 4 a speed of about 20 feet per minute gives good results.

What I claim is:

1. In a machine for thrashing podded or shell-enclosed field crops, a rubbing drum, two co-acting converging and downwardly sloping feeding belt conveyors, terminal rollers disposed close to one another over which said conveyors pass and closely adjacent to and parallel with said rubbing drum, said rubbing drum being arranged to be rotated with its periphery so close to the feed opening between said rollers, through which opening the crop is adapted to be slowly fed by the belts of said feeding conveyors, that as the pods or shells are projected towards the periphery of the rubbing drum they are, while being held in said feed opening, broken open and split by what is in effect a rubbing or abrading action which takes place between the said drum periphery and one of said terminal rollers, which action thereby releases the kernels and sieving and winnowing means provided at a lower level onto which said kernels drop.

2. A machine as claimed in claim 1, wherein one of the said terminal rollers is resiliently mounted whereby the pods or shells, as they pass between the rollers, are subjected to a resilient gripping action which obviates any tendency to break or crack the kernels by crushing and also allows for automatic adjustment of the feed opening due to variations in the rate of feed.

3. A machine as claimed in claim 1, wherein to facilitate the breaking of the pods or shells to free the kernels therefrom, the rubbing drum is provided with a plurality of projections on its peripheral surface, which projections are in the form of short studs.

4. In a machine for thrashing podded or shell-enclosed field crops, a rubbing drum, terminal rollers, two converging co-acting and downwardly sloping feeding conveyor belts, which form two opposite sides of the bottom of a feed hopper and are arranged to project downwardly and towards one side of said hopper where they pass over said terminal rollers, said rollers being arranged one above the other in close proximity to and parallel with said rubbing drum which is arranged to rotate so that the side thereof, which faces the aforesaid terminal rollers, rotates in a downward direction, whereby the pods or shells, which are projected towards the periphery of the drum by said co-acting conveyor belts, are subjected to a rubbing or abrading action, whereby the pods or shells are broken, sieving and winnowing means onto which the free kernels or seeds drop, and a suitable framework for said parts.

5. A machine as claimed in claim 4, wherein the freed kernels or seeds are arranged to drop downwardly onto a short concave located beneath said rubbing drum, on which concave rubber strips are provided to cause a further separation of the kernels from the stalks and trash before said kernels are fed to the said sieving and winnowing means.

6. A machine as claimed in claim 4, wherein the upper of the two aforesaid terminal rollers is spring-urged towards the lower roller, while said lower roller is adjustably mounted whereby the distance from the feed opening between the rollers, and the rubbing drum, is capable of adjustment to suit different thrashing conditions.

7. A machine as claimed in claim 4, wherein the feeding conveyor belts are driven at equal speeds by suitable driving means transmitting power to the driving shafts thereof, said shafts being located one on each side of said feed hopper.

8. A machine as claimed in claim 4, wherein the driving means consists of an endless chain passing over chain wheels on the ends of the driving shafts of the driving rollers of the conveyors, and wherein an adjustable tensioning chain wheel is provided for adjusting the chain tension, and also to cause correct rotation of the terminal rollers.

JOHN ANDRIES CASS.

REFERENCES CITED

The following references are of record in the file of this patent:

UNITED STATES PATENTS

| Number | Name | Date |
| --- | --- | --- |
| 41,637 | Pease | Feb. 16, 1864 |
| 87,705 | Quinn | Mar. 9, 1869 |
| 437,987 | Harbin | Oct. 7, 1890 |
| 1,319,122 | Shelton | Oct. 21, 1919 |
| 2,262,453 | Dray | Nov. 11, 1941 |
| 2,354,264 | Hitchcock | July 25, 1944 |

FOREIGN PATENTS

| Number | Country | Date |
| --- | --- | --- |
| 414,245 | Great Britain | Aug. 2, 1934 |